United States Patent
Banhos

(10) Patent No.: US 11,512,600 B2
(45) Date of Patent: Nov. 29, 2022

(54) AIRFOIL WITH RADIALLY-SPACED RIBS AND INTERLOCKING TAB

(71) Applicant: RAYTHEON TECHNOLOGIES CORPORATION, Farmington, CT (US)

(72) Inventor: Jonas S. Banhos, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/216,952

(22) Filed: Mar. 30, 2021

(65) Prior Publication Data

US 2022/0316347 A1    Oct. 6, 2022

(51) Int. Cl.
| | |
|---|---|
| F01D 5/00 | (2006.01) |
| F01D 5/28 | (2006.01) |
| F02C 3/04 | (2006.01) |
| F02C 7/00 | (2006.01) |

(52) U.S. Cl.
CPC ............... *F01D 5/282* (2013.01); *F02C 3/04* (2013.01); *F02C 7/00* (2013.01); *F05D 2220/32* (2013.01); *F05D 2240/35* (2013.01); *F05D 2300/603* (2013.01)

(58) Field of Classification Search
None
See application file for complete search history.

(56) References Cited

U.S. PATENT DOCUMENTS

| | | | |
|---|---|---|---|
| 10,408,084 B2 | 9/2019 | Thomas et al. | |
| 10,808,547 B2 | 10/2020 | Lessard et al. | |
| 2012/0051900 A1* | 3/2012 | Clements | F01D 9/041 415/208.2 |
| 2015/0204237 A1* | 7/2015 | Zemitis | F02C 3/04 29/889.1 |
| 2016/0258320 A1* | 9/2016 | Thomas | F01D 25/005 |
| 2017/0009589 A1* | 1/2017 | Gupta | F01D 5/18 |
| 2017/0130590 A1* | 5/2017 | Spangler | F01D 25/12 |
| 2020/0011190 A1* | 1/2020 | Read | C04B 35/80 |
| 2020/0318488 A1* | 10/2020 | Kamrath | F01D 11/005 |

FOREIGN PATENT DOCUMENTS

EP    3064715    9/2016

OTHER PUBLICATIONS

European Search Report for European Patent Application No. 22165626.7 dated Aug. 2, 2022.

* cited by examiner

*Primary Examiner* — Edwin Kang
(74) *Attorney, Agent, or Firm* — Carlson, Gaskey & Olds, P.C.

(57) ABSTRACT

An airfoil incudes an airfoil section that defines an internal cavity. The airfoil section is formed of a fiber-reinforced composite that is comprised of fiber plies. The fiber plies include core fiber plies and an overwrap fiber ply that wraps around the core fiber plies. The core fiber plies are arranged as first and second tubes. each of the first and second tubes defines a plurality of windows therein. The windows of the first tube align with the windows of the second tube so as to form radially-spaced ribs that extend across the internal cavity. At least one of the first or second tubes has at least one tab that is radially between the radially-spaced ribs. The at least one tab interlocks the first and second tubes.

11 Claims, 3 Drawing Sheets

AIRFOIL WITH RADIALLY-SPACED RIBS AND INTERLOCKING TAB

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes an airfoil section that defines an internal cavity. The airfoil section is formed of a fiber-reinforced composite comprised of fiber plies. The fiber plies include core fiber plies and an overwrap fiber ply that wraps around the core fiber plies. The core fiber plies are arranged as first and second tubes. Each of the first and second tubes define a plurality of windows therein. The windows of the first tube align with the windows of the second tube so as to form radially-spaced ribs extending across the internal cavity. At least one of the first or second tubes has at least one tab that is radially between the radially-spaced ribs. The at least one tab thereby interlocks the first and second tubes.

In a further embodiment, the airfoil section includes first and second radial ends, and the ribs are radially spaced from at least one of the first or second radial ends such that there is a partial window between the at least one of the first or second radial ends and the ribs.

In a further embodiment, the at least one tab includes first and second tabs on the first tube.

In a further embodiment, the first and second tabs extend into radially consecutive ones of the windows of the second tube.

In a further embodiment, the airfoil section includes first and second radial ends, and the ribs are radially spaced from the first and second radial ends such that there are first and second partial windows between the respective first and second radial ends and the ribs.

In a further embodiment, the second tube includes first and second fingers that extend into the respective first and second partial windows and border the respective the first and second radial ends.

In a further embodiment, the ribs include filler noodles between the core fiber plies of the first and second tubes.

In a further embodiment, the filler noodles abut the overwrap fiber ply.

In a further embodiment, the filler noodles include fillets defining curved corners of the windows.

A gas turbine engine according to an example of the present disclosure includes a compressor section, a combustor in fluid communication with the compressor section, and a turbine section in fluid communication with the combustor. The turbine section has airfoils disposed about a central axis of the gas turbine engine. Each of the airfoils includes an airfoil section that defines an internal cavity. The airfoil section is formed of a fiber-reinforced composite comprised of fiber plies. The fiber plies include core fiber plies and an overwrap fiber ply that wraps around the core fiber plies. The core fiber plies are arranged as first and second tubes. Each of the first and second tubes define a plurality of windows therein. The windows of the first tube align with the windows of the second tube so as to form radially-spaced ribs extending across the internal cavity. At least one of the first or second tubes has at least one tab that is radially between the radially-spaced ribs. The at least one tab thereby interlocks the first and second tubes.

In a further embodiment, the airfoil section includes first and second radial ends, and the ribs are radially spaced from at least one of the first or second radial ends such that there is a partial window between the at least one of the first or second radial ends and the ribs.

In a further embodiment, the at least one tab includes first and second tabs on the first tube, and the first and second tabs extend into radially consecutive ones of the windows of the second tube.

In a further embodiment, the airfoil section includes first and second radial ends, and the ribs are radially spaced from the first and second radial ends such that there are first and second partial windows between the respective first and second radial ends and the ribs.

In a further embodiment, the second tube includes first and second fingers that extend into the respective first and second partial windows and border the respective the first and second radial ends.

An airfoil according to an example of the present disclosure includes an airfoil section that defines an internal cavity. The airfoil section is formed of a fiber-reinforced composite comprised of fiber plies. The fiber plies include core fiber plies and an overwrap fiber ply that wraps around the core fiber plies. The core fiber plies are arranged as first and second tubes. Each of the first and second tubes define a plurality of windows therein. The windows of the first tube align with the windows of the second tube so as to form radially-spaced ribs extending across the internal cavity. The airfoil section includes first and second radial ends, and the ribs are radially spaced from at least one of the first or second radial ends such that there is a partial window between the ribs and the at least one of the first or second radial ends.

In a further embodiment, the ribs include filler noodles between the core fiber plies of the first and second tubes.

In a further embodiment, the filler noodles abut the overwrap fiber ply.

In a further embodiment, the filler noodles include fillets defining curved corners of the windows.

In a further embodiment, at least one of the first or second tubes has at least one tab that is radially between the radially-spaced ribs, the at least one tab thereby interlocking the first and second tubes.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
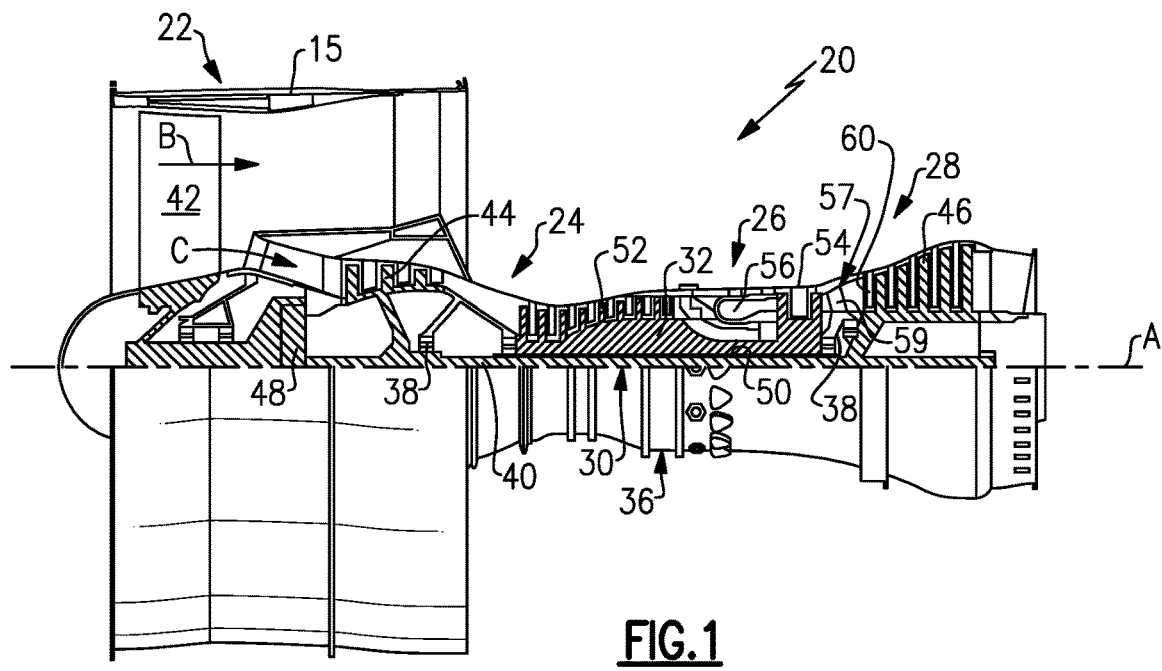
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 5,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
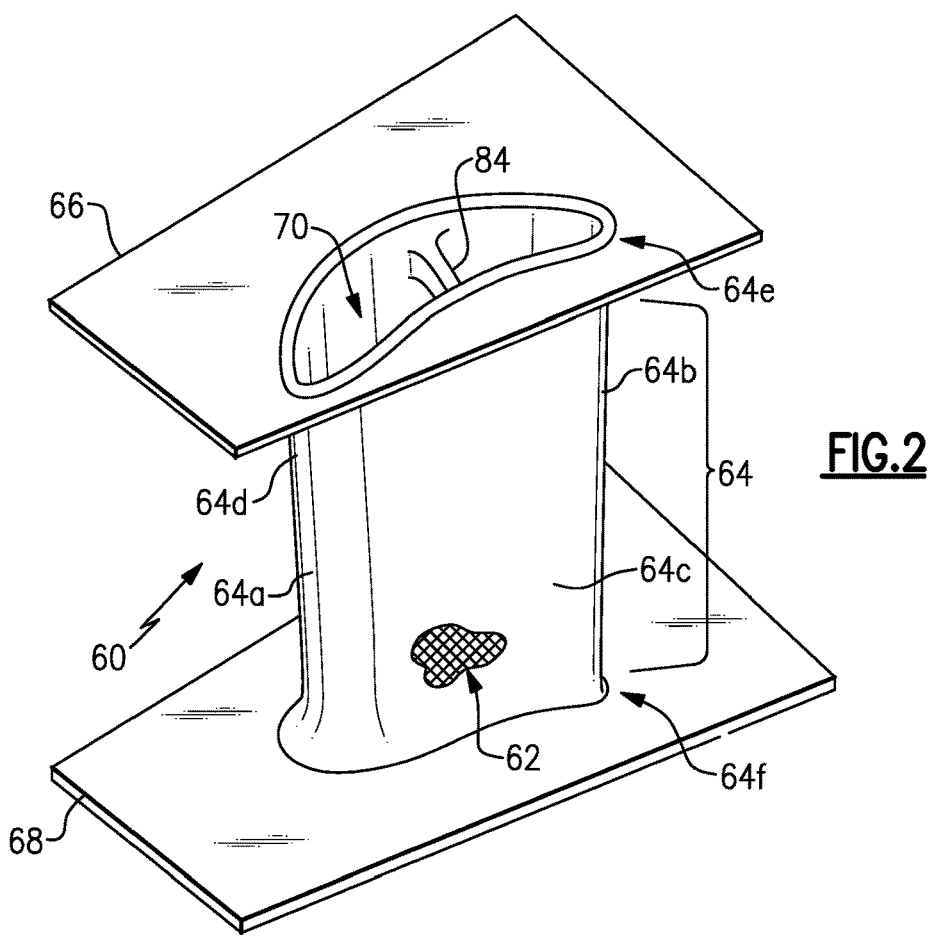
FIG. 2 illustrates an airfoil of the engine.

FIG. 2 illustrates an isometric view of an example airfoil 60 from the turbine section 28 of the engine 20 (see also FIG. 1). For instance, the airfoil 60 is supported between inner and outer support hardware and there are multiple airfoils 60 arranged in a circumferential row in the engine 20. It is to be understood that although the examples herein are shown in context of a vane from the turbine section 28, the examples can be applied to vanes or other types of airfoils in other portions of the engine 20.

The airfoil 60 is formed by a fiber-reinforced composite 62 (shown in partial cutaway view). For example, the fiber-reinforced composite 62 is a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum. The fiber tows are arranged in a fiber architecture, which refers to an ordered arrangement of the tows relative to one another, such as a 2D woven ply or a 3D structure.

In the illustrated example, the airfoil 60 is comprised of an airfoil section 64 and first and second platforms 66/68 between which the airfoil section 64 extends. The airfoil section 64 circumscribes an internal cavity 70 and defines leading and trailing ends 64a/64b and first and second sides 64c/64d that join the leading and trailing ends 64a/64b. In this example, the first side 64c is a pressure side and the second side 64d is a suction side. The airfoil section 64 spans radially, relative to the central engine axis A, between a first (outer) radial end 64e to a second (inner) radial end 64f. The terms such as "inner" and "outer" refer to location with respect to the central engine axis A, i.e., radially inner or radially outer. Moreover, the terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

Figure 3:
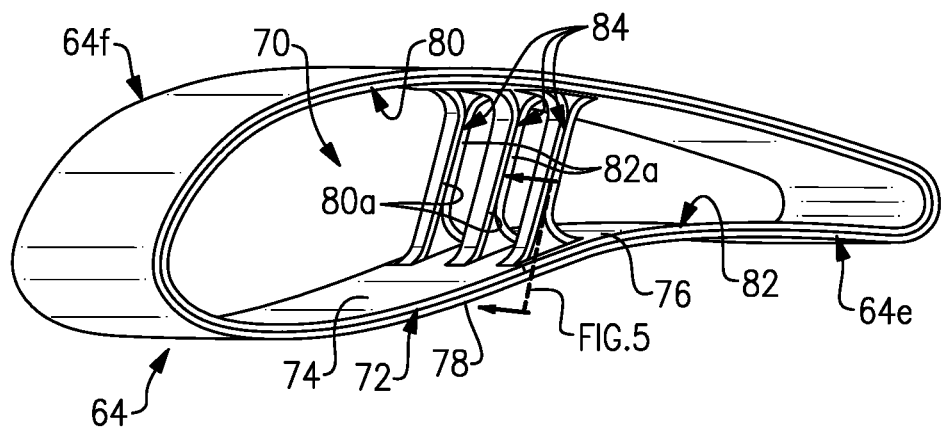
FIG. 3 illustrates a sectioned view of the airfoil.

FIG. 3 shows the airfoil section 64 without the platforms 66/68. The aforementioned fiber-reinforced composite 62 is comprised of fiber plies 72. The fiber tows of the fiber plies 72 are arranged in a fiber architecture, which refers to an ordered arrangement of the tows relative to one another. For example, the fiber plies 72 are 2D woven plies, such as but not limited to, harness satin weave plies (e.g., 8 harness satin weave) or braided plies (e.g., bi- or tri-axial braid).

Figure 4:
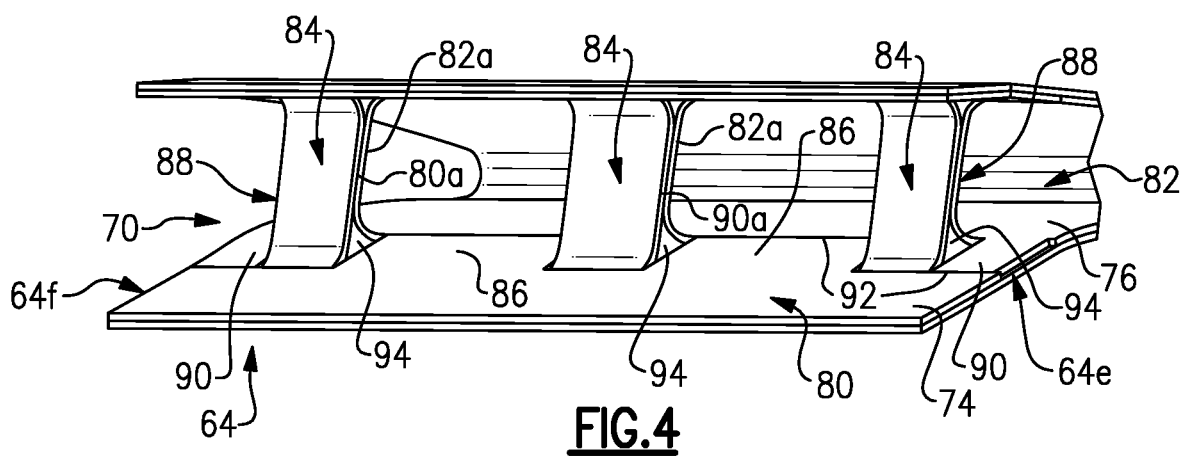
FIG. 4 illustrates a further sectioned view of the airfoil.

The fiber plies 72 include core fiber plies 74/76 and an overwrap fiber ply 78 that wraps around the core fiber plies 74/76. Although represented as single plies in the examples, it is to be understood that multiple layers of core fiber plies 74/76 and/or overwrap fiber plies 78 may be used. The core fiber plies 74/76 are arranged as, respectively, first and second tubes 80/82. In the illustrated example, the first tube 80 is a forward tube that circumscribes a forward sub-cavity of the internal cavity 70, and the second tube 82 is an aft tube that circumscribes an aft sub-cavity of the internal cavity 70. Referring also to FIG. 4 that illustrates a further sectioned view, the first and second tubes 80/82 define respective windows 80a/82a. The windows 80a of the first tube 80 align with the windows 82a of the second tube 82 so as to form radially-spaced ribs 84 that extend across the internal cavity 70. At least one of the first or second tubes 80/82 has at least one tab 86 that is radially between the radially-spaced ribs 84. In the illustrated example, the first tube 80 has two such tabs 86.

The tabs 86 are extensions of the core fiber ply 74 and serve to interlock the first tube 80 with the second tube 82. For instance, the tabs 86 extend into the windows 82a of the second tube 82, thereby limiting potential relative radial movement between the tubes 80/82 via interference between the tabs 86 and the sides of the windows 82a. Such interlocking may facilitate stabilization and reinforcement of the tubes 80/82. It is to be understood that the second tube 82 may alternatively or additionally have one or more tabs 86 that are extensions of the core fiber ply 76 and that extend into the window(s) 80a of the first tube 80 in a likewise manner.

In the illustrated example, the tabs 86 extend into radially consecutive windows 82a of the second tube 82. Thus, the middle one of the ribs 84 is sandwiched between the tabs 86, thereby enhancing the interlocking between the tubes 80/82.

In general, the fiber-reinforced composite 62 of which the airfoil 60 is formed has significantly lower thermal conductivity than superalloys and does not possess the same strength and ductility characteristics, making it more susceptible to distress from thermal gradients and the thermally induced stresses those cause. The high strength and toughness of superalloys permits resistance to thermal stresses, whereas by comparison materials such as ceramics are more prone to distress from thermal stress. Thermal stresses may cause distress at relatively weak locations, such as interlaminar interfaces between fiber plies where delamination can occur and/or at fillets between wall sections.

With regard to a rib, there may be thermal gradients between the regions of the rib at the pressure and suction side walls and the mid-region of the rib between the side walls. Such gradients may cause a bi-axial stress state in which stresses are induced in the direction between the side walls and in the radial direction. For a radially continuous rib that extends fully between radial end of an airfoil section, the radial stress may accumulate over the entire radial length of the rib, thereby causing an elevated stress state. With the radially-spaced ribs 84, however, the individual radial length of each rib 84 is considerably shorter than a fully extending rib and is thus permitted to expand or contract rather than react to the high thermal strains from a fully extending rib. As a result, for the same thermal conditions, the stress in each rib 84 is expected to be less than the stress in a fully extending rib (without windows).

Several additional aspects of the present disclosure are described below. Although the features described below are shown in combination with the features described above, it is to be understood that the features above may be used independently from those below, and vice versa. As shown in FIG. 4, the ribs 84 are radially spaced from the first and second radial ends 64e/64f of the airfoil section 64. Such a spacing defines first and second partial windows 88 between the first and second radial ends 64e/64f and the ribs 84 (i.e., the first and last ribs). The partial windows 88 serve as insulation regions that thermally separate the ribs 84 from the platforms 66/68.

The platforms 66/68 have a relatively "cold" side that faces away from the core gas path such that the platforms 66/68, or at least portions thereof, may be at substantially lower temperatures than portions of the airfoil section 64. If the ribs 84 were in abutment with the platforms 66/68, such a temperature difference may induce thermal gradients and stresses in the ribs 84. By separating the ribs 84 from the platforms 66/68, the partial windows 88 thereby limit the thermal influence of the platforms 66/68 on the ribs 84. Optionally, the partial windows 88 may in full or in part serve as a pocket for receiving a mating feature of the platforms 66/68 to attach the platforms 66/68 to the airfoil section 64. Alternatively, if thermal gradients are not a concern and/or if the pocket is not needed, the ribs 84 could be spaced from only one or other of the first and second radial ends 64e/64f such that there is only one partial window 88.

The second tube 82 includes first and second fingers 90 that radially "bookend" the ribs 84. The fingers 90 extend into the respective partial windows 88 and border the first and second radial ends 64e/64f. The fingers 90, similar to the tabs 86, are extensions of the core fiber ply 76 of the second tube 82 and serve to further interlock the first tube 80 with the second tube 82. It is to be understood that the first tube 80 may alternatively include one or both of the fingers 90.

Figure 5:
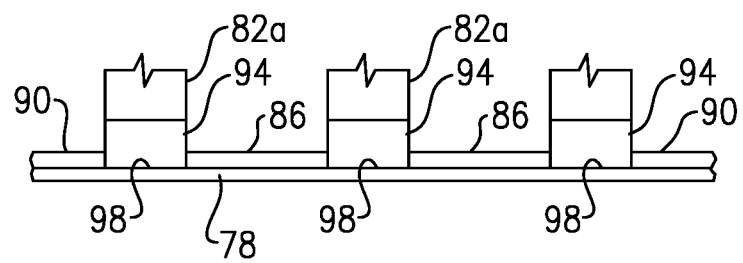
FIG. 5 illustrates a sectioned view through ribs and filler noodle of the airfoil.

As also shown in FIG. 4, the ribs 84 include filler noodles 94 situated between the core fiber plies 74/76 of the first and second tubes 80/82. FIG. 5 illustrates a sectioned view (see FIG. 3) through a portion of the ribs 84. As shown, the filler noodles 94 sit between the tabs 86 and fingers 90 and abut the overwrap fiber ply 78 at interfaces 96. For example, the filler noodles 94 are matrix material without any fibers or with discontinuous fibers. The filler noodles 94 serve to fill regions in the fiber reinforced composite 62 that would otherwise be void.

Figure 6:
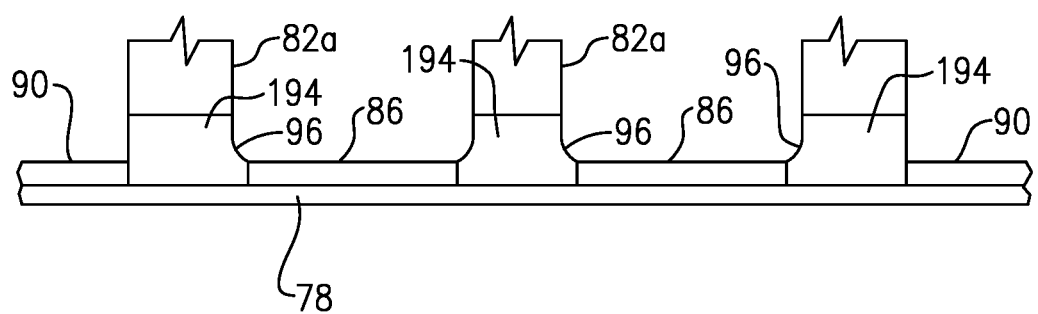
FIG. 6 illustrates an example of filler noodles with fillets.

FIG. 6 illustrates another example of filler noodles 194. In the prior example, the filler noodles 94 have straight sides such that the corners of the windows are well-defined. In contrast, the filler noodles 194 have fillets 98 that define curved corners of the windows. The fillets 98 provide a gradual transition between the sides of the windows and may facilitate reductions in stress concentrations in comparison to the well-defined corners.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section defining an internal cavity, the airfoil section being formed of a fiber-reinforced composite comprised of fiber plies, the fiber plies including core fiber plies and an overwrap fiber ply that wraps around the core fiber plies, the core fiber plies being arranged as first and second tubes, each of the first and second tubes defining a plurality of windows therein, the windows of the first tube aligning with the windows of the second tube so as to form radially-spaced ribs extending across the internal cavity, at least one of the first or second tubes having at least one tab that is radially between the radially-spaced ribs, the at least one tab thereby interlocking the first and second tubes, the at least one tab including first and second tabs on the first tube, the first and second tabs extending into radially consecutive ones of the windows of the second tube, the airfoil section including first and second radial ends, the radially-spaced ribs being radially spaced from the first and second radial ends such that there are first and second partial windows between the respective first and second radial ends and the radially-spaced ribs, the second tube including first and second fingers that extend into the respective first and second partial windows and border the respective the first and second radial ends, the at least one tab is an extension of one of the core fiber plies of the first tube.

2. The airfoil as recited in claim 1, wherein the radially-spaced ribs include filler noodles between the core fiber plies of the first and second tubes.

3. The airfoil as recited in claim 2, wherein the filler noodles abut the overwrap fiber ply.

4. The airfoil as recited in claim 2, wherein the filler noodles include fillets defining curved corners of the windows of the first and second tubes.

5. The airfoil as recited in claim 1, wherein each of the radially-spaced ribs includes core fiber plies from the first tube and core fiber plies from the second tube.

6. The airfoil as recited in claim 1, wherein radially inner and outer sides of the windows of the first tube radially align respectively with radially inner and outer sides of the windows of the second tube.

7. A gas turbine engine comprising:
a compressor section;
a combustor in fluid communication with the compressor section; and
a turbine section in fluid communication with the combustor, the turbine section having airfoils disposed about a central axis of the gas turbine engine, each of the airfoils includes:
an airfoil section defining an internal cavity, the airfoil section being formed of a fiber-reinforced composite comprised of fiber plies, the fiber plies including core fiber plies and an overwrap fiber ply that wraps around the core fiber plies, the core fiber plies being arranged as first and second tubes, each of the first and second tubes defining a plurality of windows therein, the windows of the first tube aligning with the windows of the second tube so as to form radially-spaced ribs extending across the internal cavity, at least one of the first or second tubes having at least one tab that is radially between the radially-spaced ribs, the at least one tab thereby interlocking the first and second tubes, the at least one tab including first and second tabs on the first tube, the first and second tabs extending into radially consecutive ones of the windows of the second tube, the airfoil section including first and second radial ends, the radially-spaced ribs being radially spaced from the first and second radial ends such that there are first and second partial windows between the respective first and second radial ends and the radially-spaced ribs, the second tube including first and second fingers that extend into the respective first and second partial windows and border the respective the first and second radial ends.

8. An airfoil comprising:
an airfoil section defining an internal cavity, the airfoil section being formed of a fiber-reinforced composite comprised of fiber plies, the fiber plies including core fiber plies and an overwrap fiber ply that wraps around the core fiber plies, the core fiber plies being arranged as first and second tubes, each of the first and second tubes defining a plurality of windows therein, the windows of the first tube aligning with the windows of the second tube so as to form radially-spaced ribs extending across the internal cavity, the airfoil section including first and second radial ends, the radially-spaced ribs are radially spaced from the first and second radial ends such that there are first and second partial windows between the respective first and second radial ends and the radially-spaced ribs, the second tube including first and second fingers that extend into the respective first and second partial windows and border the respective the first and second radial ends, at least one of the first or second tubes has at least one tab that is radially between the radially-spaced ribs, the at least one tab thereby interlocking the first and second tubes, the at least one tab including first and second tabs on the first tube, the first and second tabs extending into radially consecutive ones of the windows of the second tube.

9. The airfoil as recited in claim 8, wherein the radially-spaced ribs include filler noodles between the core fiber plies of the first and second tubes.

10. The airfoil as recited in claim 9, wherein filler noodles abut the overwrap fiber ply.

11. The airfoil as recited in claim 10, wherein the filler noodles include fillets defining curved corners of the windows.

* * * * *